M. E. BRIGHAM.
OILING DEVICE.
APPLICATION FILED DEC. 5, 1908.
915,731.
Patented Mar. 23, 1909.
2 SHEETS—SHEET 1.
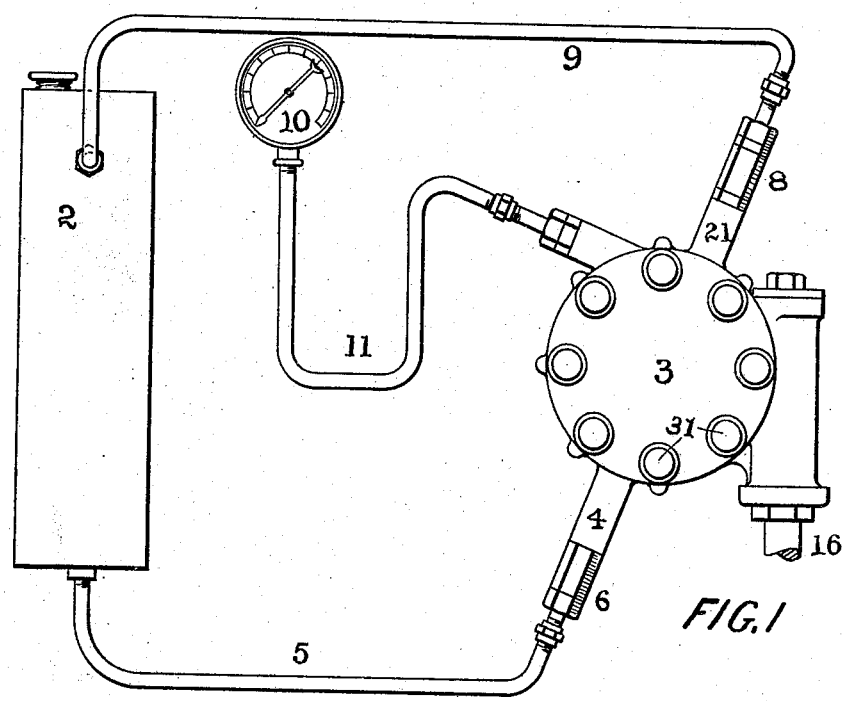
FIG. 1
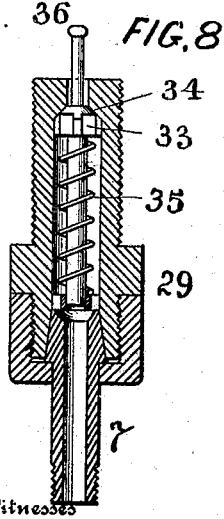
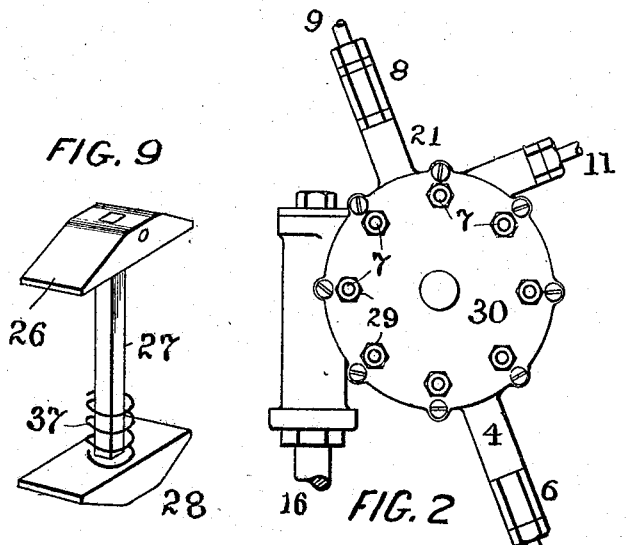

M. E. BRIGHAM.
OILING DEVICE.
APPLICATION FILED DEC. 5, 1908.
915,731.
Patented Mar. 23, 1909.
2 SHEETS—SHEET 2.
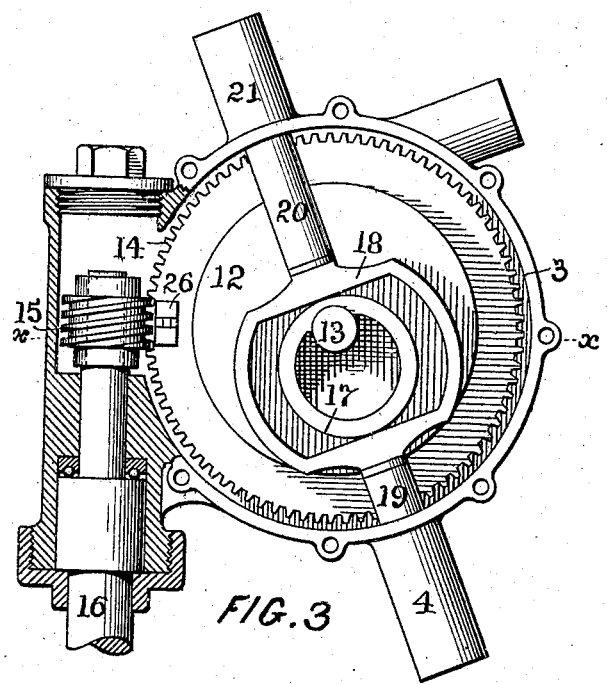
FIG. 3
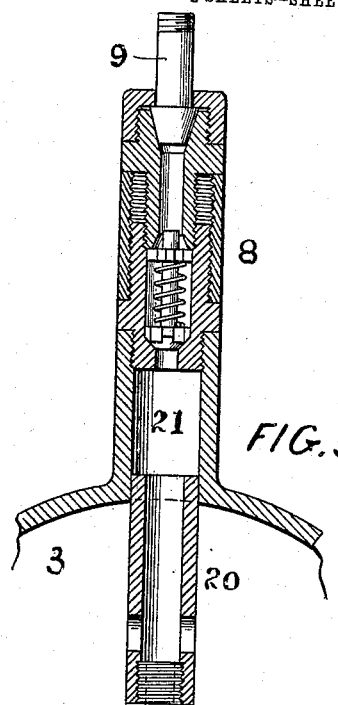
FIG. 5
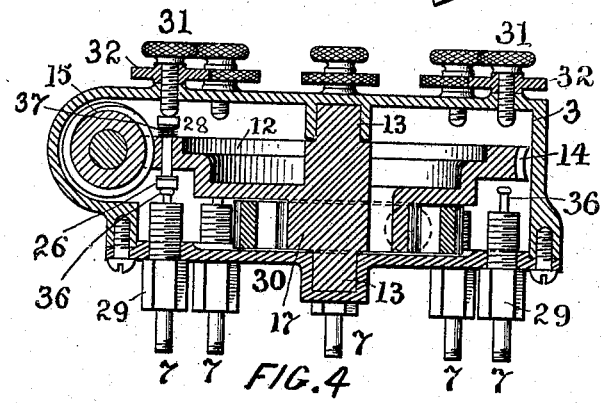
FIG. 4
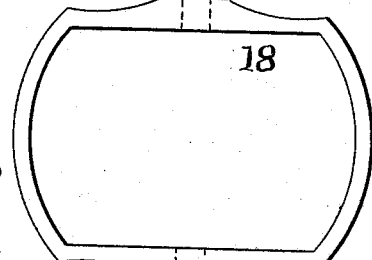
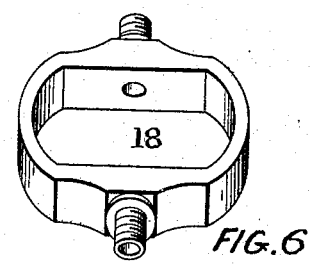
FIG. 6
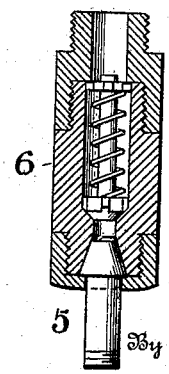
FIG. 7
Witnesses
Daniel Webster, Jr.
A. Rettig
Inventor
Martin E. Brigham
By
Attorney

UNITED STATES PATENT OFFICE.

MARTIN E. BRIGHAM, OF PHILADELPHIA, PENNSYLVANIA.

OILING DEVICE.

No. 915,731.　　　　Specification of Letters Patent.　　　Patented March 23, 1909.

Application filed December 5, 1908. Serial No. 466,065.

*To all whom it may concern:*

Be it known that I, MARTIN E. BRIGHAM, a citizen of the United States, and a resident of the city and county of Philadelphia, State of Pennsylvania, have invented an Improvement in Oiling Devices, of which the following is a specification.

My invention has reference to oiling devices and consists of certain improvements which are fully set forth in the following specifications and shown in the accompanying drawings which form a part thereof.

My invention has special use for lubricating the machinery of automobiles and may be employed in connection with machinery of any other character where a multiplicity of parts are required to be individually oiled and especially where a different amount of oil is required to be supplied to two or more or to each of said parts to be lubricated.

The object of my invention is to provide means for lubricating a plurality of independent portions of one or more machines from a common source of oil supply; and moreover, to insure the proper amount of oil being delivered to each of the parts to be lubricated without regard to the amount of oil delivered to other parts.

My invention further has for its object, the economical distribution of the oil to the machinery to be oiled, whereby only the exact amount of oil necessary is supplied to the parts to be lubricated for a given amount of work which is done, and whereby further, all waste of oil is eliminated and the exact quantity of oil necessary for the proper lubrication for each independent machine, or parts of the machine, shall be supplied.

My invention consists of an oil chamber having a plurality of outlets from which the oil is supplied to the different parts to be lubricated, combined with means for supplying the chamber with oil under pressure, and controlling devices for regulating the automatic flow of oil through the plurality of outlets in a given time; further, in the above devices, when used in conjunction with an oil reservoir for supplying oil to the chamber, and pressure relief devices for permitting the oil from the chamber to flow into the reservoir whenever the pressure under which the oil in the chamber exists exceeds the predetermined normal pressure; further, in the apparatus as specified, when provided with means for varying the amount of oil which may be discharged from any one or more of the plurality of outlets, so that a different amount of oil may be discharged from any outlet at different times and under predetermined control, and to a different extent from each of the outlets, if so desired.

In a general sense, my invention comprehends the above features, so far as the distribution of the oil is concerned, when employed with an oil chamber in which the oil is maintained under pressure.

More specifically, my invention consists of a chamber having a plurality of outlets closed by spring actuated valves and said outlets being adapted to supply oil to different parts of a machine or machines, combined with a pump to deliver oil into the chamber under pressure, and a rotating valve controlling device for successively operating the spring actuated valves of the various outlets, so as to allow discharge of the oil therefrom, and means to adjust the extent to which each valve is opened to independently regulate the relative amounts of oil discharged from the several outlets.

My invention further comprehends details of construction which, together with the features above specified, will be better understood by reference to the drawings, in which:

Figure 1 is an elevation showing my improved oiling apparatus; Fig. 2 is an elevation of a portion of the same viewed from the opposite side; Fig. 3 is a view corresponding to Fig. 2 with the cover removed and with part of the casing in section; Fig. 4 is a cross sectional view of Fig. 3 on line X—X; Fig. 5 is an enlarged view showing the pumping mechanism in section; Fig. 6 is a perspective view of the pump actuating yoke; Fig. 7 is a sectional elevation of one of the check valves which may be used with the pump; Fig. 8 is a sectional view of one of the oil distributing valves; and Fig. 9 is a perspective view of one of the actuating tappets for actuating the oil valves.

A reservoir for the lubricant is indicated at 2 and may be of any character, and from said reservoir oil is supplied by pipe 5 to the case 3 of the distributing devices, from which it is distributed by pipes 7 to the different parts of the automobile or other machine to be lubricated. The pipe 5 connects with a check valve 6, which may be of the character shown in Fig. 7 and screwed into the bottom of the pump 4 formed on the case 3. This pump 4 consists of the cylinder 22 in which the plunger 19 works, said plunger being made tubular and having a valve seat 23 upon which a check valve 24 seats itself under the action of a spring 25, said parts being located within the plunger as shown in Fig. 5. The plunger is secured to a yoke 18 within the case 3 and is reciprocated by an eccentric 17 formed on a rotating disk 12 arranged within the case 3 and journaled at 13 in bearings in the case and cover plate 30 thereof as shown in Fig. 4. This disk 12 is provided with a worm wheel 14 which is driven by a worm 15 rotated by a shaft 16 and in this manner the disk is positively rotated at a moderate speed and thereby operates the pump 4. The shaft 16 may be rotated by any means desired. The disk 12 may be rotated in any other suitable manner if so preferred, its particular manner of being driven being immaterial.

The yoke 18 is provided upon its side opposite to the pump plunger 19, with a plunger 20 which is guided in a tubular guide 21 on the case 3 (Fig. 5). This plunger 20 is hollow and communicates with the interior of the case 3 so that oil may flow from the case through it and be discharged through a relief valve 8 whenever the pressure of the oil within the case exceeds a predetermined amount. The oil so discharged through the relief valve 8, passes by pipe 9 back again into the tank or reservoir 2. The pressure under which the oil exists in the case 3 is indicated by a pressure gage 10 which connects with the case 3 by a pipe 11, said pipe having sealed within it a quantity of air. The pipe 11 therefore acts as an air chamber and being elastic, permits the oil to be more or less variable in quantity in the case 3 while being circulated under a given pressure. As oil is non-compressible, it is essential to provide some means for imparting the pressure in elastic or responsive form to permit a circulation of the oil when released, and the preferred means is the employment of a small air chamber in which air is maintained under compression and made to act as an accumulator. It is evident that an air pocket of any kind in connection with the case 3 will meet the requirements of my invention.

The distributing pipes 7 are secured to the distributing valves 29 which are screwed into the cover 30 in a circle, with the axis of the disk 12 as a center. The cover 30 is screwed tightly upon the open face of the case 3, so as to make the case an oil tight chamber which is normally full of oil under pressure. The valves 29 are constructed as shown in Fig. 8 and comprise a valve seat 34 combined with a valve piece 33 held to the seat by a spring 35. The valve spindle is extended through the valve seat to form a tappet pin 36. The valve piece and its stem are guided within the valve casing so as to have free movement and yet always seat correctly when released. It will now be understood that while the valves 29 are normally closed against the passage of oil from the case 3, because the pressure of the spring 35 exerted upon the valve piece 34 is greater than the pressure of the oil exerted upon said valve piece, it is only necessary to press upon the tappet pin to open the valve, and the oil will pass through the valve and into the distributing pipe 7 to the place of lubrication, because of the pressure under which the oil constantly exists in the case 3. The longer the valve is kept open the greater the quantity of oil delivered in a given time. The means for operating these valves to accomplish the said results will now be described.

The disk 12 is provided with a sliding tappet 26, the front and rear ends of which are beveled to give it a cam action. This tappet is secured to the end of a polygonal shaped guide 27 which forms a sliding connection with the disk 12 (Fig. 4). The other end of the guide 27 is provided with a cam head 28 similar to the tappet 26 but turned in the opposite direction (Fig. 9). A spring 37 is arranged between the cam head 28 and the disk 12 to cause the tappet to be normally drawn back to the front face of the disk and out of contact with the tappet pins 36 of the distributing valves. Back of the line of travel of the cam head 28 and in line with the several distributing valves 29 are screws 31 extending through the back of case 3 and these are provided with jams or lock nuts 32 to lock them in their positions of adjustment. It will now be understood that if all of the screws 31 be adjusted back so that the cam head 28 does not touch them when carried around with the disk 12 in its rotation, none of the distributing valves will be opened and no oil distributed. If now, one or more of the screws 31 be adjusted so that the cam head 28 will be struck by them, the tappet 26 will be correspondingly projected and made to operate the respective tappet pins 36 of the distributing valves to cause said valves to open temporarily with each revolution of the disk 12. The greater the distance the screws 31 are inserted into the case 3 the longer will the valves remain open during the passage of the tappet and consequently the greater will be the delivery of oil for each revolution of the disk. It is evident that the engineer has at his command the possibility of causing any quantity of oil to be distributed from each pipe 7 with each revolution of the disk, and that the quantity from any pipe may be greatly different from that of the other pipes. While I have shown eight distributing valves, it is to be understood that I do not restrict myself to any number of such valves as the numbers may be greater or less to suit the requirements.

In case the oil reservoir 2 is at an elevation above the pump 4, and the oil within the reservoir is under pressure, the check valve 6 may be omitted, but I prefer to use the check valve at the bottom of the pump or at some point between it and the reservoir 2. The valve devices are made in an inexpensive manner and so as to be easy of access and the pipes 5, 7 and 9 are detachably clamped to the valve bodies so as to be easily disconnected when desired, but all of these parts may be made in other ways if desired.

It will be understood that the capacity of the apparatus to distribute oil is in a great measure dependent upon its speed, hence where a large amount of oil must be supplied per hour, the result may be secured with a small apparatus by simply speeding up the disk 12.

While the adjusting screws for adjusting the action of the tappet are simple and effective, it will be understood that the same result may be secured in a variety of ways and I therefore do not restrict myself in this respect. It is also apparent that, while the travel of the tappet in a circle is the most satisfactory and compact arrangement and therefore preferred, there is no necessity of such restriction and hence I consider it within the scope of my invention to operate the distributing valves in any manner desired. For convenience and compactness I have arranged the pump within the case, but it is evident that the operation would be the same if it was arranged otherwise and hence I do not confine myself to this preferred arrangement.

I have shown my invention in the form in which I have used it in commercial practice and while it has proven most effective and satisfactory, I nevertheless do not limit myself to the details thereof as they may be modified without departing from the spirit of the invention.

Having now described my invention what I claim as new and desire to secure by Letters Patent, is:

1. In oiling devices, the combination of a pressure chamber, a plurality of distributing pipes leading from the chamber, valves controlling the flow of oil from the chamber into the distributing pipes, means for maintaining the oil within the chamber under pressure, and means for intermittently opening the valves for permitting the oil to flow from the chamber into the respective distributing pipes.

2. In oiling devices, the combination of a pressure chamber, a plurality of distributing pipes leading from the chamber, valves controlling the flow of oil from the chamber into the distributing pipes, means for maintaining the oil within the chamber under pressure, means for intermittently opening the valves for permitting the oil to flow from the chamber into the respective distributing pipes, and means for independently varying the time during which the respective valves are maintained in open position with each intermittent operation thereof.

3. In oiling devices, the combination of a pressure chamber, a plurality of distributing pipes leading from the chamber, valves controlling the flow of oil from the chamber into the distributing pipes, means for maintaining the oil within the chamber under pressure consisting of an air chamber in communication with the pressure chamber and in which air is held under compression, a pump for forcing oil into the chamber, and means for intermittently opening the valves for permitting the oil to flow from the chamber into the respective distributing pipes.

4. In oiling devices, the combination of a pressure chamber, a plurality of distributing pipes leading from the chamber, valves controlling the flow of oil from the chamber into the distributing pipes, means for maintaining the oil within the chamber under pressure consisting of an air chamber in communication with the pressure chamber and in which air is held under compression, a pump for forcing oil into the chamber, a relief device for allowing escape of oil from the chamber independent of the distributing pipes whenever the pressure within the chamber exceeds a predetermined amount, and means for intermittently opening the valves for permitting the oil to flow from the chamber into the respective distributing pipes.

5. In oiling devices, the combination of a pressure chamber, a plurality of distributing pipes leading from the chamber, valves controlling the flow of oil from the chamber into the distributing pipes, means for maintaining the oil within the chamber under pressure consisting of an air chamber in communication with the pressure chamber and in which air is held under compression, a pump for forcing oil into the chamber, a relief device for allowing escape of oil from the chamber independent of the distributing pipes whenever the pressure within the chamber exceeds a predetermined amount, a closed reservoir for the oil, a pipe leading from the reservoir to the pump, a relief pipe for discharging the oil from the relief device into the reservoir, and means for intermittently opening the valves for permitting the oil to flow from the chamber into the respective distributing pipes.

6. In oiling devices, the combination of a pressure chamber, a plurality of distributing pipes leading from the chamber, valves controlling the flow of oil from the chamber into the distributing pipes, means for maintaining the oil within the chamber under pressure, and means for intermittently opening the valves for permitting the oil to flow from the chamber into the respective distributing pipes, said means consisting of a rotating disk having a tappet arranged to successively operate the valves.

7. In oiling devices, the combination of a pressure chamber, a plurality of distributing pipes leading from the chamber, valves controlling the flow of oil from the chamber into the distributing pipes, means for maintaining the oil within the chamber under pressure, and means for intermittently opening the valves for permitting the oil to flow from the chamber into the respective distributing pipes, said means consisting of a rotating disk having a tappet arranged to successively operate the valves, and independent means for each valve for varying the action of the tappet upon the said valves whereby the respective valves may be opened for a relatively longer or shorter period of time.

8. In oiling devices, the combination of a pressure chamber, a plurality of distributing pipes leading from said chamber, independent means for controlling the flow of oil from the chamber into each distributing pipe, means for maintaining a supply of oil under pressure within the chamber, and means arranged to successively operate the independent means for controlling the flow of oil.

9. In oiling devices, the combination of a pressure chamber, a plurality of distributing pipes leading from said chamber, independent means for controlling the flow of oil from the chamber into each distributing pipe, means for maintaining a supply of oil under pressure within the chamber, means arranged to successively operate the independent means for controlling the flow of oil and adjusting devices for each of the independent means for regulating the extent of flow of oil from the chamber into the respective distributing pipes.

10. In oiling devices, the combination of a pressure chamber, a disk journaled therein, means to rotate the disk, a pump operated by the disk and discharging into the chamber, a plurality of oil distributing pipes leading from said chamber, a valve for each distributing pipe, and a device carried by the disk for opening the valves successively.

11. In oiling devices, the combination of a pressure chamber, a disk journaled therein, means to rotate the disk, a pump operated by the disk and discharging into the chamber, a plurality of oil distributing pipes leading from said chamber, a valve for each distributing pipe, and a device carried by the disk for opening the valves successively, consisting of a tappet for striking the valve pieces of the valves, and adjusting screws on the chamber for controlling the extent of the action of the tappet upon the respective valves.

12. In oiling devices, the combination of a pressure chamber, a disk journaled therein, means to rotate the disk, a pump operated by the disk and discharging into the chamber, a relief valve for permitting the discharge of excess of oil pumped into the chamber, an air chamber communicating with the oil space within the chamber for maintaining an elastic pressure upon the oil, a plurality of oil distributing pipes leading from said chamber, a valve for each distributing pipe, and a device carried by the disk for opening the valves successively.

13. In oiling devices, the combination of a pressure chamber, a disk journaled therein, means to rotate the disk, a pump operated by the disk and discharging into the chamber, a relief valve for permitting the discharge of excess of oil pumped into the chamber, an air chamber communicating with the oil space within the chamber for maintaining an elastic pressure upon the oil, means to return the oil discharged from the relief valve to the pump, a plurality of oil distributing pipes leading from said chamber, a valve for each distributing pipe, and a device carried by the disk for opening the valves successively.

14. In an oiling device, the combination of a closed chamber, a plurality of oil distributing pipes leading therefrom, a valve for each of said distributing pipes having its valve piece provided with a tappet pin, a disk journaled to rotate within the chamber, means to rotate the disk, a tappet loosely carried by the disk and movable to and from the tappet pins, adjustable abutments for operating the tappet for each of the valves, and means for locking the abutments in adjusted positions.

15. In an oiling device, the combination of a closed chamber, a plurality of oil distributing pipes leading therefrom, a valve for each of said distributing pipes having its valve piece provided with a tappet pin, a disk journaled to rotate within the chamber, means to rotate the disk, a tappet loosely carried by the disk and movable to and from the tappet pins, springs for moving the tappets away from the tappet pins, adjustable abutments consisting of screws for operating the tappet for each of the valves, and means for locking the screws in adjusted positions.

16. In an oiling device, the combination of a closed chamber, a plurality of oil distributing pipes leading therefrom, a valve for each of said distributing pipes having its valve piece provided with a tappet pin, a disk journaled to rotate within the chamber and provided with an eccentric means to rotate the disk, a tappet loosely carried by the disk and movable to and from the tappet pins, adjustable abutments for operating the tappet for each of the valves, means for locking the abutments in adjusted positions, and a pump for forcing oil into the chamber and operated by the eccentric.

MARTIN E. BRIGHAM.

Witnesses:
 R. M. HUNTER,
 WM. H. SMITH.